United States Patent [19]

Swaim

[11] 4,028,073
[45] June 7, 1977

[54] CONTAINER FOR AIR TREATING MATERIAL

[76] Inventor: Charles M. Swaim, 994 Hampton Park, Barrington, Ill. 60010

[22] Filed: Mar. 12, 1976

[21] Appl. No.: 666,218

[52] U.S. Cl. .................................. 55/279; 55/503; 21/74 R; 21/78; 206/482
[51] Int. Cl.² .......................................... B01D 50/00
[58] Field of Search ................ 55/279, 316, 385 R, 55/490, 495, 503, 519, 480, 493; 21/74 R, 78; 220/76; 206/464, 465, 482

[56] References Cited
UNITED STATES PATENTS

| 1,048,394 | 12/1912 | Dickinson | 55/279 |
| 1,528,640 | 3/1925 | Turzicky et al. | 55/279 |
| 3,643,040 | 2/1972 | Kaneyasu | 55/279 |
| 3,902,877 | 9/1975 | Swaim | 55/490 |

FOREIGN PATENTS OR APPLICATIONS

| 501,309 | 11/1954 | Italy | 55/279 |

Primary Examiner—Frank W. Lutter
Assistant Examiner—David L. Lacey
Attorney, Agent, or Firm—Wegner, Stellman, McCord, Wiles & Wood

[57] ABSTRACT

A stamped metal container for attachment to a structure in a fluid system as, for example, an air filter, for holding a body of fluid treating material in the system and having a bottom, a peripheral, upstanding side wall and an open top. A plurality of cutouts are located in the bottom and at least two of the cutouts are elongated and defined by tabs struck from the bottom at different locations thereon. Each tab has an end remaining attached to the container at or closely adjacent to the side wall. Each tab also has a length substantially greater than the height of the side wall and is directed upwardly and away from the bottom and substantially parallel to the side wall. The tabs may penetrate an air filter and be bent over to engage the backing thereof to hold the container thereon.

3 Claims, 2 Drawing Figures

CONTAINER FOR AIR TREATING MATERIAL

BACKGROUND OF THE INVENTION

This invention relates to containers for fluid treating materials and, more specifically, to containers for air treating material attachable to air filters in ventilation systems.

In my prior United States Letters Pat. No. 3,902,877, there is disclosed a container for air treating material which may be attached to a conventional air filter in a ventilation system. During operation of the ventilation system, air circulated through the filter impinges against the air treating material in the container and is accordingly deodorized, sanitized, or the like.

While perfectly satisfactory for its intended purpose, the form of the container illustrated in my prior patent required that a hole be formed in the air filter for receipt of the container. The formation of such a hole can sometimes be an awkward procedure.

SUMMARY OF THE INVENTION

It is the principal object of the invention to provide a new and improved container for holding a fluid treating material in a fluid system. More specifically, it is an object of the invention to provide such a container for holding an air treating material in a ventilation system by attachment to an air filter or the like which container is inexpensive to fabricate, reusable, and does not require special handling of an air filter or the like prior to attachment of the container thereto.

An exemplary embodiment of the invention achieves the foregoing object in a container formed of a bendable material and having a bottom, a peripheral, upstanding side wall and an open top. The bottom is provided with a plurality of cutouts to permit fluid to enter the container therethrough and contact the body of air treating material contained therein. At least one of the cutouts is elongated and is defined by an elongated tab integral with the container. The tab has a length greater than the height of the side wall and is adapted to penetrate an air filter and be bent over the backing thereof to hold the container and the body of air treating material therein in abutment with the air filter.

In a highly preferred embodiment, there are two such tabs, each remaining attached to the container adjacent the side wall at different locations on the container.

Preferably, the height of the side wall is less than the thickness of the air filter to which the container is to be attached and the ends of the tabs are shaped to easily penetrate an air filter.

Other objects and advantages will become apparent from the following specification taken in connection with the accompanying drawings.

DESCRIPTION OF THE PREFERRED EMBODIMENT

Figure 1:
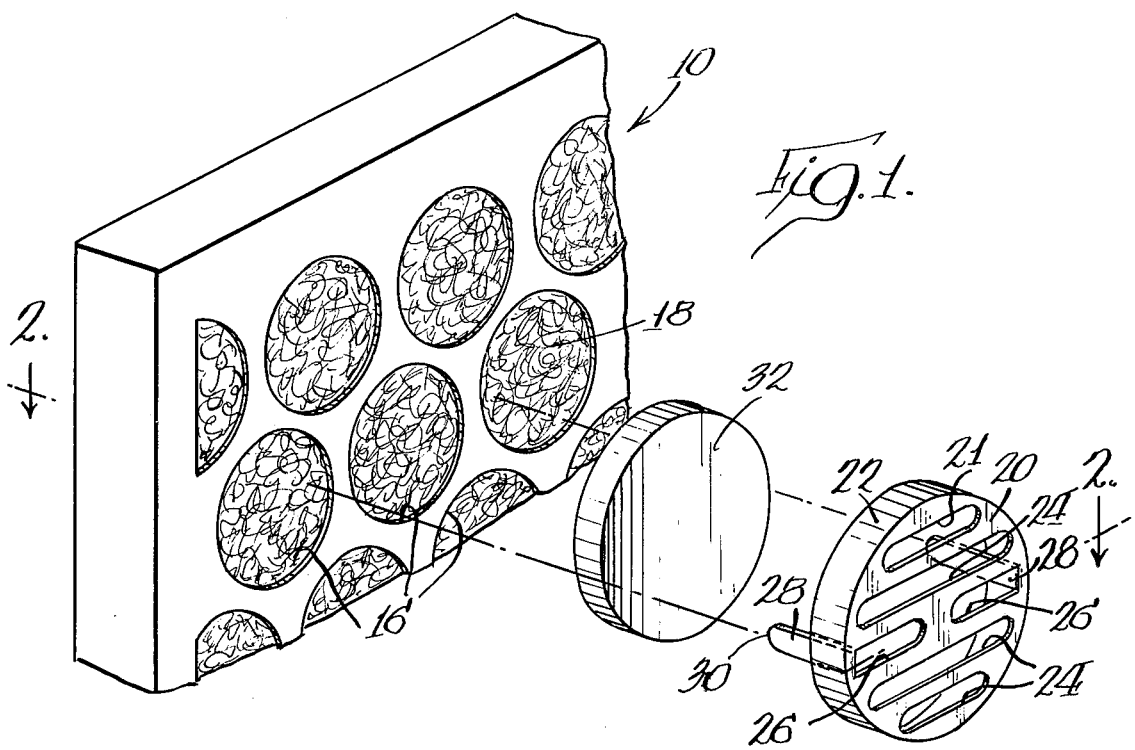
FIG. 1 is a exploded, perspective view of a container made according to the invention in connection with a body of air treating material and an air filter.
Figure 2:
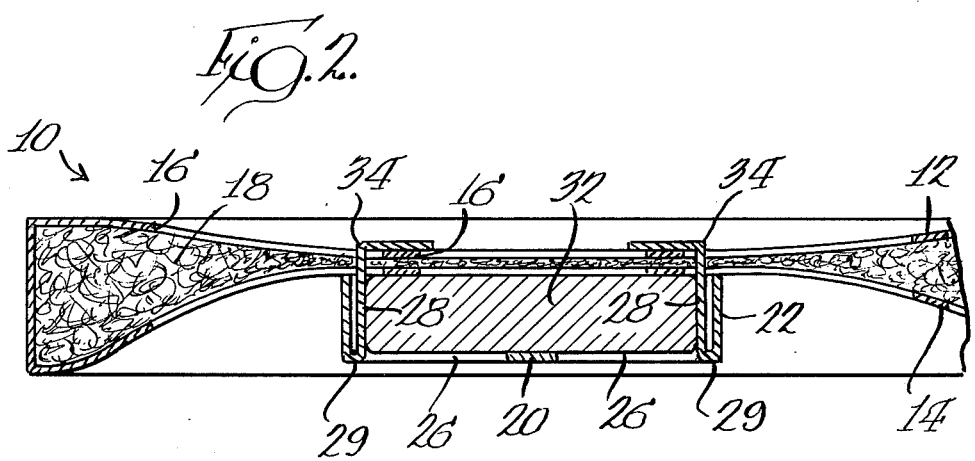
FIG. 2 is an enlarged, fragmentary, sectional view taken approximately along the line 2—2 of FIG. 1.

An exemplary embodiment of a container for a fluid treating material made according to the invention is illustrated in FIGS. 1 and 2 in connection with a filter element, namely, a conventional air filter of the type typically employed in forced air ventilation systems. The filter is generally designated 10 and includes flexible, front and back backing members 12 and 14 which are perforated as at 16 and which sandwich a filtering material 18, such as fiberglass.

The container of the present invention is formed of a bendable material, most commonly metal, preferably by stamping. The same includes a bottom 20 surrounded by a peripheral, upstanding side wall 22. The container is open topped.

The bottom 20 is provided with a series of cutouts 24 whereby the fluid, normally air, may achieve admittance to the interior of the container.

Two of the cutouts are designated 26 and are defined by elongated tabs 28 struck from the bottom 20. Each of the tabs 28 has a length greater than the height of the side wall 22 and remains joined to the container at the point 29 which is at or in close adjacency to the side wall 22.

In a preferred embodiment, the free ends 30 of the tabs 28 are curved or pointed so that they may easily penetrate the filter material 18.

Prior to installation, the tabs 28 will be substantially parallel to the side wall 22 and directed away from the bottom 20. Because they remain attached to the container in close adjacency to the side walls 22, the center of the container is unobstructed for receipt of a cake 32 of any desired air treating material. For example, the cake 32 may be of a deodorizing or a sanitizing material or may comprise a carrier for such a material.

To install the container with the cake 32 therein on an air filter, the tabs 28 are directed through apertures 16 in the backing members 12 and 14 of the filter and the filtering material 18 compressed as illustrated in FIG. 2. The ends 30 of the tabs 28 may then be bent over at a point 34, as seen in FIG. 2, to overlie portions of one of the backing members between the apertures 16.

It is to be particularly noted that the height of the side wall 22 is preferably less than the thickness of the filter to which the container is to be attached. In many ventilating systems, the filter must be inserted through an elongated, narrow opening scarcely wider than the width of the filter. By forming the container to have a height less than the width of the filter, the filter material can be compressed, as illustrated in FIG. 2, so that at the point where the container is attached to the filter, the thickness of the combined assemblage will be no greater than the normal width of the filter so that the combined assemblage may be easily inserted through such an opening.

From the foregoing, it will be appreciated that a container made according to the invention is economically formed of a minimum number of parts. It will also be appreciated that the same may be reused simply by straightening the tabs 28 and reinstalling the same as mentioned. Finally, it will be recognized that no special preassembly operation need be performed on the filter 10 prior to assembly of the container and the cake thereon.

I claim:

1. Air treating means including a container for holding a body of air treating material to an air filter in a ventilation system or the like, said container being formed of a bendable material and having a bottom, a peripheral upstanding side wall extending from said bottom and terminating in an open top, there being a plurality of cutouts in said bottom to permit air to enter said container therethrough, at least one of said cutouts being elongated and defined by an elongated tab integral with said container and having a length greater than the height of said side wall, there being two said tabs, each remaining attached to said container adjacent said side wall, an air filter having a layer of filter material sandwiched between perforated backing members, said tabs extending through said filter and having their ends bent over one of said backing members; and a body of air treating material in said container.

2. The combination of claim 1 wherein the height of said side wall is less than the thickness of said air filter.

3. In an air treating system including a penetrable air filter, a perforate container mounted on the filter, and a treating material in the container the improvement wherein the container comprises a stamped metal container for attachment to a structure in a fluid system for holding a body of fluid treating material in the system and having a bottom, a peripheral upstanding side wall extending from bottom and terminating in an open top, a plurality of cutouts in said bottom, at least two of said cutouts being elongated and defined by bendable tabs struck from said bottom at different locations thereon, each tab having an end remaining attached to said container at or closely adjacent to said side wall, each tab having a length substantially greater than the height of said side wall and being directed upwardly and away from said bottom or substantially parallel to said side wall and extending through said filter and bent thereabout to mount the container on the filter with the filter closing the open top of the container.

* * * * *